United States Patent
Schubert et al.

(10) Patent No.: US 8,226,842 B2
(45) Date of Patent: *Jul. 24, 2012

(54) COMPOSITION AND METHOD FOR REMOVAL OF CARBONYL SULFIDE FROM ACID GAS CONTAINING SAME

(75) Inventors: Craig N. Schubert, Lake Jackson, TX (US); Arnold C. Ashcraft, Perrineville, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,955

(22) Filed: Aug. 16, 2010

(65) Prior Publication Data

US 2010/0301269 A1 Dec. 2, 2010

Related U.S. Application Data

(63) Continuation of application No. 10/549,743, filed as application No. PCT/US2004/007453 on Mar. 11, 2004, now Pat. No. 7,857,891.

(51) Int. Cl.
- B01D 53/14 (2006.01)
- C01B 17/00 (2006.01)
- B01J 8/04 (2006.01)

(52) U.S. Cl. .............. 252/60; 95/235; 95/236; 423/228; 423/229

(58) Field of Classification Search ............... 95/181, 95/235–236; 423/242–243
See application file for complete search history.

(56) References Cited

U.S. PATENT DOCUMENTS

| | | | |
|---|---|---|---|
| 3,737,392 A | 6/1973 | Ameen et al. | |
| 3,773,896 A | 11/1973 | Preusser et al. | |
| 4,336,233 A * | 6/1982 | Appl et al. | 423/228 |
| 4,980,140 A | 12/1990 | Souby | |
| 5,167,941 A * | 12/1992 | Bedell | 423/242.2 |
| 5,413,627 A * | 5/1995 | Landeck et al. | 95/235 |
| 6,436,174 B1 * | 8/2002 | Grossmann et al. | 95/191 |
| 6,852,144 B1 * | 2/2005 | Wagner et al. | 95/181 |
| 7,857,891 B2 * | 12/2010 | Schubert et al. | 95/235 |
| 2006/0178259 A1 | 8/2006 | Schubert et al. | |

FOREIGN PATENT DOCUMENTS

GB 1058304 2/1967

\* cited by examiner

*Primary Examiner* — Duane Smith
*Assistant Examiner* — Ives Wu
(74) *Attorney, Agent, or Firm* — Kagan Binder, PLLC

(57) ABSTRACT

Novel solvent composition for selective removal of COS from a gas stream containing same, said composition comprising a) at least one polyalkylene glycol alkyl ether of the formula $$R_1O\text{-}(Alk\text{-}O)_n\text{-}R_2 \quad (I)$$

or 1,3-dimethyl-3,4,5,6-tetrahydro-2(1H)-pyrimidinone or a mixture of N-formylmorpholine and N-acetylmorpholine wherein $R_1$ is an alkyl group having from 1 to 6 carbon atoms; $R_2$ is hydrogen or an alkyl group having from 1 to 4 carbon atoms; Alk is an alkylene group, branched or unbranched, having from 2 to 4 carbon atoms, and n is from 1 to 10; and b) at least one alkanolamine compound of the formula $$R_3NHR_4OR_6 \quad (II)$$

or at least one piperazine compound of formula

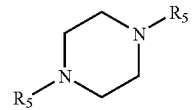

(III)

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

8 Claims, No Drawings

COMPOSITION AND METHOD FOR REMOVAL OF CARBONYL SULFIDE FROM ACID GAS CONTAINING SAME

CROSS-REFERENCE TO RELATED APPLICATION

This application is a Continuation of U.S. Ser. No. 10/549,743 filed Sep. 9, 2005, which is a 371 of PCT/US2004/007453 filed Mar. 11, 2004, which claims the benefit of U.S. Provisional Application Ser. No. 60/456,354, filed Mar. 21, 2003.

The present invention relates to an improved composition for selective removal of carbonyl sulfide (COS) with minimal absorption of carbon dioxide ($CO_2$) from an acid gas containing COS and $CO_2$, and also to a method for selective removal of COS from an acid gas containing COS and $CO_2$ using this improved composition.

Natural and synthesis gas streams, derived from natural gas reservoirs, petroleum or coal, often contain a significant amount of carbonyl sulfide (COS) in addition to other impurities such as carbon dioxide ($CO_2$), hydrogen sulfide ($H_2S$), sulfur dioxide ($SO_2$), carbon disulfide ($CS_2$), and mercaptans. Various compositions and processes for removal of acid gases, including COS, from a gas containing same are known and described in the literature.

Certain physical solvents have been widely used for the selective removal of $H_2S$ from gas streams containing $H_2S$, $CO_2$ and optionally, other components. For example, dialkyl ethers of polyalkylene glycols are commonly specified for this purpose. Typical of the numerous disclosures of such solvents in the art is European Patent Application No. EP 0770420 A2 and U.S. Pat. Nos. 3,737,392; 3,824,766; 3,837,143; 4,044,100; 4,336,233; 4,581,154; 4,741,745; and 4,946,620, among others. According to such references, it is well known that the solubility of $H_2S$ in these glycols is much higher than the solubility of $CO_2$. This difference in solubility forms the basis for the selective removal of $H_2S$ by glycol ethers and other physical solvents. Unfortunately, the solubility of COS in most physical solvents is not very different from the solubility of $CO_2$. Hence, selective removal of COS or COS and $H_2S$ from gas streams containing $CO_2$ and optionally other components, has proved difficult.

Certain tertiary alkanolamines (methyldiethanolamine and triethanolamine for example) have been widely used for the selective removal of $H_2S$ from gas streams which also contain $CO_2$. Users of these amines exploit the rapid reaction with $H_2S$ and the slow reaction with $CO_2$ to allow selective removal of $H_2S$. Unfortunately, the reaction of these amines with COS is about 100 times slower than the reaction with $CO_2$. Hence, tertiary amines are relatively ineffective at separating COS or COS and $H_2S$ from $CO_2$ containing streams.

Certain primary and secondary amines (monoethanolamine, diethanolamine, methylethanolamine, aminoethoxy ethanol, piperazine for example) have been widely used for the simultaneous removal of $H_2S$ and $CO_2$. These amines react rapidly with both $H_2S$ and $CO_2$ and are well suited for simultaneous removal of $H_2S$ and $CO_2$. Although the reaction of COS with these amines is also about 100 times slower than the reaction with $CO_2$, appreciable amounts of $CO_2$ and COS can be removed. Unfortunately, since COS reacts much more slowly with these amines than does $CO_2$, selective removal of COS or COS and $H_2S$ with primary or secondary amines has proved difficult.

The selective removal of COS or COS and $H_2S$ from gas streams containing $CO_2$ and optionally other components has proved difficult with both physical and chemical solvents. However, in a number of conventional hydrocarbon processing techniques, it is desirable or necessary to remove COS down to few parts per million (ppmv) for several reasons, such as catalyst sensitivity to COS in subsequent operations and statutory or contract requirements regarding sulfur content in product or waste gas streams. The presence of COS has also been identified as the cause of degradation reactions in several commercial processes for acid gas removal. However, in many cases it is neither necessary nor desirable to remove $CO_2$ from gaseous mixtures.

Various solvent compositions and methods are known for selective removal of COS and $H_2S$ from gaseous mixtures containing same and other acidic gases such as $CO_2$.

U.S. Pat. No. 3,989,811 (Hill) discloses a multi-step process for removal of acid gases, that is, $H_2S$, $CO_2$, and sulfur containing compounds including $CS_2$, COS, and various mercaptans from sour gases. In this multi-step process, $H_2S$, $CO_2$ and COS are absorbed in a nonselective alkanolamine. The regenerated acid gases are then contacted with a selective amine to produce an $H_2S$ rich stripper off gas and a low pressure $CO_2$ rich stream. Suitable alkanolamines include methyldiethanolamine, triethanolamine, or one or more dipropanolamines, such as di-n-propanolamine or diisopropanolamine. The preferred absorbent for treatment of COS containing gas streams also contains a significant amount of a tetramethylene sulfone (the unsubstituted compound is known as sulfolane). In principle, selective removal of COS and $H_2S$ from the original sour gas stream could be achieved if the $CO_2$ rich product stream were recompressed and combined with the main treated gas stream. However, the capital and operating costs associated with requiring two absorbers, two strippers and compression of the $CO_2$ stream would weigh against this option, assuming a less costly alternative can be found.

U.S. Pat. No. 4,482,529 (Chen et al.) discloses a single step process for the selective removal of COS from a gas stream containing $CO_2$. Small amounts of bicyclo tertiary amine are added to a physical solvent already known to be selective for $H_2S$ in the presence of $CO_2$. According to the invention, addition of the bicyclo tertiary amine encourages hydrolysis of the COS to $H_2S$ and $CO_2$. The net effect is to improve the absorption of COS without substantially increasing the absorption of $CO_2$. Applicable physical solvents include SELEXOL™ solvent (a blend of polyethylene glycol dimethyl ethers sold by Union Carbide Corporation under the trademark SELEXOL), sulfolane, methanol and others.

U.S. Pat. No. 4,524,050 (Chen et al.) discloses a process for hydrolyzing COS in gas streams to $H_2S$ and $CO_2$ using solid supported bicyclo tertiary amine catalyst.

U.S. Pat. No. 4,504,449 (Doerges et al.) discloses a process for selective removal of $H_2S$ and possibly COS from a $CO_2$ containing gas stream using highly volatile secondary amines in an organic solvent. A complex regeneration scheme is required. Applicable secondary amines are diethyl amine, diisopropyl amine, methyl isopropyl amine, ethyl isopropyl amine, dipropyl amine, methyl n-butylamine, methyl isobutyl amine and methyl sec-butyl amine. Applicable organic solvents include alkylated polyethylene glycol ethers, tetrahydrothiophene dioxide etc.

U.S. Pat. No. 4,532,116 (Doerges et al.) discloses a process for the removal of $H_2S$ and/or COS from synthesis gas using at least one secondary amine and an organic solvent. Although the process is selective for $H_2S$ and COS in the presence of $CO_2$, the process is complex. Two scrubbing zones are required—a preliminary desulfurizing zone using a conventional circulated and regenerated solution and a fine desulfurizing or scrubbing zone using unregenerated solvent.

The fine desulfurizing zone contains a heat exchanger to condense the unregenerated solvent. Applicable organic solvents are methanol, ethanol and isopropanol. Applicable secondary amines are N-ethylethaneamine, N-(1-methylethyl)propaneamine, N-methyl-2-propanamine, N-ethyl-2-propanamine, N-propyl-1-propanamine, N-methyl-1-butanamine, N-2-dimethyl-1-propanamine, N-methyl-2-butanamine.

U.S. Pat. No. 4,749,555 (Bush) discloses a process for selective removal of $H_2S$ and COS without absorbing $CO_2$ from a gas stream having a relatively large concentration of $CO_2$ using bridgehead amines (bicyclotertiary amine or bicyclo amidine), tertiary amine, physical solvent and water. Applicable physical solvents include sulfolane, polyethylene glycol dimethyl ethers and others.

U.S. Pat. No. 4,980,140 (Souby) discloses a process for selective removal of COS from $H_2S$ using a solvent comprising a tertiary amine, a physical co-solvent and a minor amount of water. The useful physical co-solvent includes sulfones, sulfoxides, glycols and the mono and diethers thereof, 1,3-dioxo heterocyclic compounds (dioxane and dioxolane), aromatic ethers, aromatic hydrocarbons and N-alkylated lactams of gamma or omega amino acids.

U.S. Pat. No. 5,413,627 (Landeck et al.) discloses the selective removal of $H_2S$ and COS from $CO_2$ using a physical scrubbing agent comprising a heterocycle having five or more ring atoms, which contains two heteroatoms, one of which is nitrogen and the other of which is oxygen or nitrogen. The nitrogen atom present in the ring is/are either double bonded or single bonded but, if single bonded, the nitrogen is organosubstituted. A wide variety of scrubbing agents are disclosed, including 1,3-dimethyl-3,4,5,6-tetrahydro-2(1H)-pyrimidinone (DMTP).

U.S. Pat. No. 5,589,149 (Garland et al.) discloses absorption solvents for removing mercaptans from gas streams without the use of iodine. The solvent comprises alkyl ether of a polyalkylene glycol and a secondary monoalkanolamine and, optionally, other amines, such as dialkanolamines.

U.S. Pat. No. 6,277,345 B1 (Stankowiak et al.) discloses the use of absorption liquid comprising at least one dialkanolamine, at least one polyalkylene glycol alkyl ether, and water for nonselective removal of $CO_2$, $H_2S$, COS and other acidic gases from a gaseous stream.

U.S. Pat. No. 6,102,987 (Gross et al.) discloses a process for removal of $CO_2$ and sulfur compounds from natural gas and raw synthesis gas with a mixture of N-formylmorpholine and N-acetylmorpholine at temperatures between $-20°$ C. and $+40°$ C. at pressure of 10 to 150 bar in absorbing operation.

There is still a need in the industry for an improved composition for selective removal of COS from gaseous streams containing COS and $CO_2$. It has now been surprisingly and unforeseeably found out that the addition of a primary alkanolamine, secondary alkanolamine or piperazine compound to a polyalkylene glycol alkyl ether or 1,3-dimethyl-3,4,5,6-tetrahydro-2(1H)-pyrimidinone (DMPT) results in selective removal of COS from the gaseous streams containing same with minimal removal of $CO_2$.

One aspect of the present invention concerns a solvent composition for removal of COS from a gas stream containing same, said composition comprising
a) at least one polyalkylene glycol alkyl ether of the formula

$$R_1O\text{-}(Alk\text{-}O)_n\text{---}R_2 \quad (I)$$

wherein $R_1$ is an alkyl group having from 1 to 6 carbon atoms; $R_2$ is hydrogen or an alkyl group having from 1 to 4 carbon atoms; Alk is an alkylene group, branched or unbranched, having from 2 to 4 carbon atoms, and n is from 1 to 10; and b) at least one alkanolamine compound of the formula

$$R_3NHR_4OR_6 \quad (II)$$

or at least one piperazine compound of formula

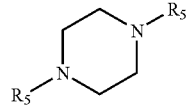

(III)

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

Another aspect the present invention concerns a solvent composition for removal of COS from a gas stream containing same, said composition comprising
a) 1,3-dimethyl-3,4,5,6-tetrahydro-2(1H)-pyrimidinone; and
b) at least one alkanolamine compound of the formula

$$R_3NHR_4OR_6 \quad (II)$$

or at least one piperazine compound of formula

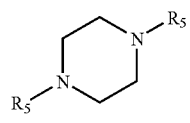

(III)

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

In another aspect, the present invention concerns a process for selective removal of COS from a gas stream containing same, said process comprising treating the gas stream with a solvent composition comprising
a) at least one polyalkylene glycol alkyl ether of the formula

$$R_{10}\text{-}(Alk\text{-}O)_n\text{---}R_2 \quad (I)$$

wherein $R_1$ is an alkyl group having from 1 to 6 carbon atoms; $R_2$ is hydrogen or an alkyl group having from 1 to 4 carbon atoms; Alk is an alkylene group, branched or unbranched, having from 2 to 4 carbon atoms; and n is from 1 to 10; and b) at least one alkanolamine compound of the formula

$$R_3NHR_4OR_6 \quad (II)$$

or at least one piperazine compound of formula

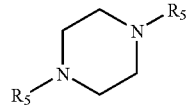

(III)

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

Still in another aspect, the present invention concerns a process for selective removal of COS from a gas stream containing same, said process comprising treating the gas stream with a solvent composition comprising
 a) 1,3-dimethyl-3,4,5,6-tetrahydro-2(1H)-pyrimidinone; and
 b) at least one alkanolamine compound of the formula

or
 at least one piperazine compound of formula

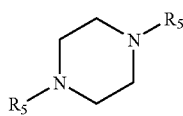

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

Still in another aspect, the present invention concerns a solvent composition for removal of COS from a gas stream containing same, said composition comprising
 a) a mixture of N-formylmorpholine and N-acetylmorpholine; and
 b) at least one alkanolamine compound of the formula

or
 at least one piperazine compound of formula

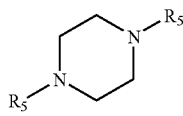

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

Still in another aspect, the present invention concerns a process for selective removal of COS from a gas stream containing same, said process comprising treating the gas stream with a solvent composition comprising
 a) a mixture of N-formylmorpholine and N-acetylmorpholine; and
 b) at least one alkanolamine compound of the formula

or
 at least one piperazine compound of formula

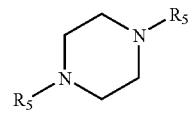

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms.

As used herein, the terms "gas", "acid gas", and "gaseous stream" are intended to refer to natural gas, hydrocarbon gas, synthesis gas, steam reformer-type gases, and any other gas containing COS, $CO_2$ and other gaseous components such as hydrogen sulfide, methane, ethane, propane, hydrogen, carbon monoxide, mercaptans etc. The expression "minimal additional removal of $CO_2$" means additional $CO_2$ absorption due to the presence of the amine additive is less than one third of the $CO_2$ present in the feed gas, all other factors being the same.

In accordance with the present invention, it has been surprisingly discovered that the solvent compositions of the present invention have excellent selectivity for the removal of COS from a gaseous stream containing same with minimal additional removal of $CO_2$.

It was completely surprising and unexpected to find out addition of an alkanolamine compound of formula II above or a piperazine compound of formula III above to least one polyalkylene glycol alkyl ether of the formula I above, and in particular to a mixture of polyalkylene glycol ethers of formula I above, such as the SELEXOL™ solvent, removes substantially more of the COS present in the gaseous streams with minimal additional removal of $CO_2$.

It was also equally surprising and unexpected to find out that the addition of an alkanolamine compound of formula II above or a piperazine compound of formula III above to 1,3-dimethyl-3,4,5,6-tetrahydro-2(1H)-pyrimidinone removes substantially more of COS present in the gaseous streams with minimal additional removal of $CO_2$ Polyalkylene alkyl ethers of formula I suitable in the practice of the present invention are well known and include, without any limitation, diethylene glycol dimethyl ether, diethylene glycol diisopropyl ether, triethylene glycol dimethyl ether, triethylene glycol diisopropyl ether, tetraethylene glycol dimethyl ether, tetraethylene glycol diisopropyl ether, pentaethylene glycol dimethyl ether, pentaethylene glycol diisopropyl ether, hexaethylene glycol dimethyl ether, hexaethylene glycol diisopropyl ether, heptaethylene glycol dimethyl ether, octaethylene glycol dimethyl ether, nonaethylene glycol dimethyl ether, decaethylene glycol dimethyl ether, and any mixture thereof.

Preferred polyethylene glycol alkyl ether is a mixture consisting of a dimethyl ethers of polyethylene glycols of formula $CH_3O(C_2H_4O)_nCH_3$ wherein n is from 2 to 10. Particularly preferred polyethylene glycol alkyl ether is the mixture of dimethyl ethers of polyethylene glycols sold under the trademark SELEXOL by Union Carbide Corporation. SELEXOL™ solvent is a mixture of dimethyl ethers of polyethylene glycols comprising from 0 to 0.5 wt percent of diethylene glycol dimethyl ether, from 5 to 7 wt percent of triethylene glycol dimethyl ether, from 16 to 18 wt percent tetraethylene glycol dimethyl ether, from 23 to 25 wt percent of pentethylene glycol dimethyl ether, from 22 to 24 wt percent of hexaethylene glycol dimethyl ether, from 15 to 17 wt percent of heptaethylene glycol dimethyl ether, from 8 to 10 wt percent of octaethylene glycol dimethyl ether, from 3 to 5 wt percent of nonaethylene glycol dimethyl ether, and from 1 to 2 wt percent of decaethylene glycol dimethyl ether. SELEXOL™ solvent is widely used in gas treating applications for the removal of acidic gases. However, it is known that the removal of COS by the SELEXOL™ solvent is poor due to solvent factors (low solubility) and applications specific factors (low COS partial pressure). Certain amine additives such as bicyclic tertiary amines and tertiary amines have been used, with some success, to improve removal of COS by SELEXOL™ solvent. It has now been discovered that the SELEXOL™ solvent containing alkanolamines of formula II hereinbefore or a piperazine compound of formula III hereinabove is surprisingly selective in removing COS in the presence of $CO_2$ from gases.

Alkanolamine compounds of formula II useful in the practice of the present invention are well known compounds and include both primary and secondary alkanolamines. Preferred alkanolamine compounds of formula II are primary alkanolamines. Non-limiting examples of alkanolamine compounds are monoethanolamine (MEA), diethanolamine (DEA), methylethanolamine (NMEA), diisopropanolamine (DIPA), and 2-(2-aminoethoxy)ethanol (AEE) also known as diethylene glycolamine (available from Huntsman Corporation under the trademark DGA).

The present invention is particularly useful in the desulfurization portion of an Integrated Combined Cycle Gasification (IGCC) process using an IGCC system consisting of a conventional SELEXOL™ solvent acid gas removal unit, a fixed bed catalytic converter for reducing the gas phase concentration of carbonyl sulfide (COS), and heat exchanger equipment upstream of the SELEXOL™ solvent unit. It has been surprisingly found out that the addition of the alkanolamine compound of formula II above to the SELEXOL™ solvent results in selective removal of COS from the gas feed in the presence of $CO_2$ with minimal removal of $CO_2$. The costs associated with the fixed bed catalytic converter are also significantly reduced.

Since the process of the present invention for selective removal of COS from gaseous streams is conducted in the desulfurization portion of an Integrated Combined Cycle Gasification (IGCC) process, the operating conditions of the process are those of the IGCC process. These operating conditions are well known to a person of an ordinary skill in the art.

All parts, percentages and ratios herein are by weight unless otherwise indicated.

The invention will be further clarified by a consideration of the following examples that are intended to be purely exemplary of the present invention and not limiting in any way.

The following components are employed in the examples.
MEA is monoethanolamine;
DEA is diethanolamine;
TEA is triethanolamine;
NMEA is methylethanoalmine;
DIPA is diisopropanolamine;
HEP is hydroxyethylpiperazine;
MDEA is methyldiethanolamine;
DMEA is dimethyethanolamine;
DBU is 1,8-diazabicyclo[5.4.0]undec-7-ene;
DBN is 1,5-diazabicyclo[4.3.0]non-5-ene;
DABCO is 1,4-diazabicyclo[2.2.2]octane, sold by Air Products and Chemicals, Inc. under the trademark DABCO;
DMTP is 1,3-dimethyl-3,4,5,6-tetrahydro-2(1H)-pyrimidinone;
Quinuclidine is 1,4-ethanolpiperidine; and
AEE is 2-(2-aminoethoxy)ethanol.

EXAMPLES 1 TO 10 AND COMPARATIVE EXAMPLES 1 TO 12

The performance of SELEXOL™ solvent alone, and the mixture of SELEXOL™ solvent and prior art additives were evaluated in a bench scale glass absorber-stripper apparatus with the following characteristics:
a) standard gas feed conditions (10 mole percent $CO_2$, 1.6 mole percent COS, and the balance nitrogen, about 3 L/min, 80° F.),
b) standard liquid feed conditions (about 11 cc/min, 80° F.),
c) standard amount of absorber and stripper staging (small trays, 25 absorber, 20 stripper),
d) approximately standard amount of stripping heat duty applied,
e) standard amount of the additive used about 3 percent by weight),
f) gas phase analysis by gas chromatography, liquid phase water content by Karl Fisher method,
g) careful attention to ensuring steady state operation,
h) liquid phase COS content was not measured, and
i) stripper overhead not sampled for COS or $H_2S$.

The results obtained in the performance evaluation of different gas treating solvent are provided in Tables below.

TABLE 1

Evaluation of Prior Art and Various Additives for Removal of COS by SELEXOL ™ solvent

| Solvent | COS Absorption (percent of feed) | $CO_2$ Absorption (percent of feed) |
| --- | --- | --- |
| SELEXOL ™ solvent* | 0.7 | 0.7 |
| SELEXOL ™ solvent* | 1.2 | 0.2 |
| S + 3 wt percent 1,4 diazabicyclo[2.2.2]octane (DABCO)* | 2.6 | 0.0 |
| S + 3 wt percent quinuclidine* | 5.1 | −0.2 |
| S + 3 wt percent 1,5-diazabicyclo[4.3.0]non-5-ene (DBN)* | 3.1 | −0.6 |
| S + 3 wt percent 1,8-diazabicyclo[5.4.0]undec-7-ene (DBU)* | 2.5 | 0.5 |
| S + 3 wt percent triethanolamine (TEA)* | 2.0 | 0.5 |
| S + 3 wt percent triethanolamine (TEA)* | −0.7 | 2.7 |
| S + 3 wt percent methyldiethanolamine (MDEA)* | 1.3 | 1.3 |

TABLE 1-continued

Evaluation of Prior Art and Various Additives for Removal of COS by SELEXOL ™ solvent

| Solvent | COS Absorption (percent of feed) | $CO_2$ Absorption (percent of feed) |
|---|---|---|
| S + 3 wt percent dimethylethanolamine (MDEA)* | 2.0 | 0.0 |
| S + 3 wt percent hydroxyethylpiperazine (HEP) | 17.1 | 0.7 |
| S + 3 wt percent diisopropanolamine (DIPA) | 18.9 | 1.0 |
| S + 3 wt percent diethanolamine (DEA) | 18.9 | 2.8 |
| S + 3 wt percent diethanolamine (DEA) | 28.3 | 0.1 |
| S + 3 wt percent monoethanolamine (MEA) | 28.3 | −0.7 |
| S + 3 wt percent piperazine | 29.1 | 0.8 |
| S + 3 wt percent methylethanolamine (NMEA)** | 6.6 | −0.6 |
| S + 3 wt percent methylethanolamine (NMEA) | 52.1 | 0.9 |
| S + 3 wt percent methylethanolamine (NMEA) | 50.3 | 1.1 |
| DMTP* | 5.8 | −1.0 |
| DMTP* | 3.6 | −1.1 |
| DMTP + 3 wt percent diethanolamine | 40.1 | 0.6 |

*not an Example of the present invention
**spurious experimental outcome
S = SELEXOL ™ solvent

TABLE 2

| | Comparative Example 1 | Example 1 | Example 2 | Comparative Example 2 | Comparative Example 3 |
|---|---|---|---|---|---|
| Base Solvent | SELEXOL ™ Solvent | SELEXOL ™ Solvent | SELEXOL ™ solvent | DMTP | SELEXOL ™ solvent |
| Additive | 0 | Piperazine | NMEA | none | DBU |
| Additive Concentration (wt percent) | 25 | 3 | 3 | 0 | 3 |
| # Absorber Trays | 20 | 25 | 25 | 25 | 25 |
| # Stripper Trays | | 20 | 20 | 20 | 20 |
| Total Gas Feed Rate (cc/min) | 2997 | 2996 | 2995 | 3026 | 3008 |
| Feed CO2 (mole percent) | 10.09 | 10.18 | 10.06 | 9.64 | 11.06 |
| Feed COS (mole percent) | 1.48 | 1.51 | 1.51 | 1.21 | 1.63 |
| Sweet CO2 (mole percent) | 10.02 | 10.1 | 10.12 | 9.74 | 11.01 |
| Sweet COS (mole percent) | 1.47 | 1.07 | 1.41 | 1.14 | 1.59 |
| Absorber: | | | | | |
| Lean H2O content (wt percent) | 3.2 | 4 | 4.6 | 7.4 | 4.3 |
| Lean Solvent Flow (cc/min) | 11 | 11 | 11 | 11 | 11 |
| Lean T (F.) | 80.7 | 78.8 | 79.8 | 79.8 | 80.5 |
| Feed Gas T (F.) | 80.8 | 79.1 | 79.5 | 79.3 | 80.3 |
| Sweet Gas T (F.) | 81.6 | 79.5 | 80.6 | 79.8 | 80.8 |
| Rich T (F.) | 79.3 | 77.6 | 78.1 | 77.9 | 77.1 |
| Absorber P (in H2O) | 28 | 28 | 28 | 28 | 28 |
| Stripper: | | | | | |
| Hot Rich Inlet T (F.) | 239.1 | 220.3 | 232.5 | 229.1 | 231.5 |
| Overhead Vap T (C.) | 103 | 100 | 103 | 100 | 100 |
| Reboiler T (F.) | 264.7 | 258.3 | 254.6 | 270.5 | 259.5 |
| COS Absorption (percent of feed) | 0.7 | 29.1 | 6.6 | 5.8 | 2.5 |
| $CO_2$ Absorption (percent of feed) | 0.7 | 0.8 | −0.6 | −1.0 | 0.5 |

TABLE 3

| | Comparative Example 4 | Comparative Example 5 | Example 3 |
|---|---|---|---|
| Base Solvent | SELEXOL ™ Solvent | SELEXOL ™ Solvent | SELEXOL ™ solvent |
| Additive | DBN | DABCO | DEA |
| Additive Concentration (wt percent) | 3 | 3 | 3 |
| Number of Absorber Trays | 25 | 25 | 25 |
| Number of Stripper Trays | 20 | 20 | 20 |
| Total Gas Feed Rate (cc/min) | 3000 | 2999 | 3004 |
| Feed CO2 (mole percent) | 10.9 | 10.26 | 10.3 |
| Feed COS (mole percent) | 1.6 | 1.51 | 1.48 |
| Sweet CO2 (mole percent) | 10.97 | 10.26 | 10.01 |
| Sweet COS (mole percent) | 1.55 | 1.47 | 1.2 |

TABLE 3-continued

|  | Comparative Example 4 | Comparative Example 5 | Example 3 |
|---|---|---|---|
| Absorber: |  |  |  |
| Lean H2O content (wt percent) | 4 | 3.6 | 4.1 |
| Lean Solvent Flow (cc/min) | 11 | 11 | 11 |
| Lean T (F.) | 80.7 | 82.3 | 81.1 |
| Feed Gas T (F.) | 80.3 | 81.8 | 81 |
| Sweet Gas T (F.) | 80.8 | 82.3 | 81.6 |
| Rich T (F.) | 79.4 | 79.5 | 79.8 |
| Absorber P (in H2O) | 28 | 28 | 28 |
| Stripper: |  |  |  |
| Hot Rich Inlet T (F.) | 227.6 | 246.5 | 226.7 |
| Overhead Vap T (C.) | 100 | 102 | 102 |
| Reboiler T (F.) | 259.9 | 260.6 | 256.1 |
| COS Absorption (percent of feed) | 3.1 | 2.6 | 18.9 |
| $CO_2$ Absorption (percent of feed) | −0.6 | 0.0 | 2.8 |

TABLE 4

|  | Example 4 | Comparative Example 6 | Comparative Example 7 | Example 5 | Example 6 |
|---|---|---|---|---|---|
| Base Solvent | SELEXOL ™ Solvent | SELEXOL ™ solvent | SELEXOL ™ solvent | SELEXOL ™ solvent | SELEXOL ™ solvent |
| Additive | MEA | Quinuclidine | none | DEA | NMEA |
| Additive Concentration (wt percent) | 3 | 3 | 0 | 3 | 3 |
| Number of Absorber Trays | 25 | 25 | 25 | 25 | 25 |
| Number of Stripper Trays | 20 | 20 | 20 | 20 | 20 |
| Total Gas Feed Rate (cc/min) | 2999 | 2978 | 2985 | 2990 | 3012 |
| Feed CO2 (mole percent) | 10.09 | 10.06 | 10.13 | 10.03 | 10.11 |
| Feed COS (mole percent) | 1.8 | 1.76 | 1.72 | 1.7 | 1.67 |
| Sweet CO2 (mole percent) | 10.16 | 10.08 | 10.11 | 10.02 | 10.02 |
| Sweet COS (mole percent) | 1.29 | 1.67 | 1.7 | 1.43 | 0.8 |
| Absorber: |  |  |  |  |  |
| Lean H2O content (wt percent) | 5.4 | 4.5 | 3.7 | 3.6 | 4 |
| Lean Solvent Flow (cc/min) | 11 | 11 | 11 | 11 | 11 |
| Lean T (F.) | 79.7 | 80.7 | 82 | 83.2 | 80.9 |
| Feed Gas T (F.) | 80.6 | 79.9 | 80.5 | 81.8 | 83.2 |
| Sweet Gas T (F.) | 81.1 | 81 | 81.4 | 83 | 83.5 |
| Rich T (F.) | 78.6 | 76.7 | 77.8 | 80.9 | 82.5 |
| Absorber P (in H2O) | 28 | 28 | 28 | 28 | 28 |
| Stripper: |  |  |  |  |  |
| Hot Rich Inlet T (F.) | 222.1 | 213.8 | 209.7 | 207.6 | 201.2 |
| Overhead Vap T (C.) | 109 | 103 | 105 | 101 | 100 |
| Reboiler T (F.) | 246.6 | 250.2 | 257.5 | 256.9 | 255.1 |
| COS Absorption (percent of feed) | 28.3 | 5.1 | 1.2 | 15.9 | 52.1 |
| $CO_2$ Absorption (percent of feed) | −0.7 | −0.2 | 0.2 | 0.1 | 0.9 |

TABLE 5

|  | Example 7 | Example 8 | Comparative Example 89 | Example 98 | Comparative Example 9 |
|---|---|---|---|---|---|
| Base Solvent | SELEXOL ™ Solvent | SELEXOL ™ Solvent | DMTP | SELEXOL ™ Solvent | SELEXOL ™ solvent |
| Additive | NMEA | DIPA | none | HEP | TEA |
| Additive Concentration (wt percent) | 3 | 3 | 0 | 3 | 3 |
| Number of Absorber Trays | 25 | 25 | 25 | 25 | 25 |
| Number of Stripper Trays | 20 | 20 | 20 | 20 | 20 |
| Total Gas Feed Rate (cc/min) | 3023 | 3013 | 3004 | 2990 | 3000 |
| Feed CO2 (mole percent) | 10.08 | 10.08 | 10.02 | 10.06 | 10.01 |
| Feed COS (mole percent) | 1.61 | 1.64 | 1.67 | 1.58 | 1.52 |
| Sweet CO2 (mole percent) | 9.97 | 9.98 | 10.13 | 9.99 | 9.96 |
| Sweet COS (mole percent) | 0.8 | 1.33 | 1.61 | 1.31 | 1.49 |
| Absorber: |  |  |  |  |  |
| Lean H2O content (wt percent) | 3.7 | 4 | 8.2 | 3.2 | 3.6 |
| Lean Solvent Flow (cc/min) | 11 | 11 | 11 | 11 | 11 |
| Lean T (F.) | 79.4 | 82.9 | 82.4 | 84.2 | 81 |
| Feed Gas T (F.) | 78.4 | 81.3 | 81.1 | 82.4 | 79.3 |

TABLE 5-continued

|  | Example 7 | Example 8 | Comparative Example 89 | Example 98 | Comparative Example 9 |
|---|---|---|---|---|---|
| Sweet Gas T (F.) | 79.4 | 82.6 | 82 | 83.7 | 80.3 |
| Rich T (F.) | 78.3 | 80.1 | 79.6 | 80.2 | 77.5 |
| Absorber P (in H2O) | 28 | 28 | 28 | 28 | 28 |
| Stripper: |  |  |  |  |  |
| Hot Rich Inlet T (F.) | 200.2 | 206.7 | 198.9 | 197.5 | 180.5 |
| Overhead Vap T (C.) | 101 | 100 | 104 | 100 | 101 |
| Reboiler T (F.) | 255.6 | 255.6 | 271.3 | 258.4 | 255.7 |
| COS Absorption (percent of feed) | 50.3 | 18.9 | 3.6 | 17.1 | 2.0 |
| $CO_2$ Absorption (percent of feed) | 1.1 | 1.0 | −1.1 | 0.7 | 0.5 |

TABLE 6

|  | Comparative Example 10 | Comparative Example 11 | Example 10 | Comparative Example 12 |
|---|---|---|---|---|
| Base Solvent | SELEXOL ™ Solvent | SELEXOL ™ Solvent | DMTP | SELEXOL ™ solvent |
| Additive | TEA | MDEA | DEA | DMEA |
| Additive Concentration (wt percent) | 3 | 3 | 3 | 3 |
| Number of Absorber Trays | 25 | 25 | 25 | 25 |
| Number of Stripper Trays | 20 | 20 | 20 | 20 |
| Total Gas Feed Rate (cc/min) | 3005 | 2995 | 2981 | 2994 |
| Feed CO2 (mole percent) | 10.17 | 10.01 | 10.09 | 9.95 |
| Feed COS (mole percent) | 1.48 | 1.52 | 1.52 | 1.47 |
| Sweet CO2 (mole percent) | 9.9 | 9.88 | 10.03 | 9.95 |
| Sweet COS (mole percent) | 1.49 | 1.5 | 0.91 | 1.44 |
| Absorber: |  |  |  |  |
| Lean H2O content (wt percent) | 4.2 | 3.8 | 8.6 | 4 |
| Lean Solvent Flow (cc/min) | 11 | 11 | 11 | 11 |
| Lean T (F.) | 82.6 | 82.6 | 80 | 80.3 |
| Feed Gas T (F.) | 80.4 | 80.4 | 79 | 79.7 |
| Sweet Gas T (F.) | 81.9 | 81.8 | 79.6 | 81 |
| Rich T (F.) | 77.8 | 78.5 | 79.4 | 76.9 |
| Absorber P (in H2O) | 28 | 28 | 28 | 28 |
| Stripper: |  |  |  |  |
| Hot Rich Inlet T (F.) | 185.2 | 189.5 | 182.2 | 198.3 |
| Overhead Vap T (C.) | 102 | 108 | 105 | 108 |
| Reboiler T (F.) | 256.6 | 257.6 | 264.3 | 253.7 |
| COS Absorption (percent of feed) | −0.7 | 1.3 | 40.1 | 2.0 |
| $CO_2$ Absorption (percent of feed) | 2.7 | 1.3 | 0.6 | 0.0 |

As can be seen from the Tables 1-6 hereinabove, certain amine additives of the prior art improve removal of COS without substantially increasing the removal of $CO_2$. For example, the addition of DABCO, quinuclidine, DBN and DBU to the SELEXOL™ solvent increases the COS removal of to the SELEXOL™ solvent from 1 percent to 2-5 percent.

EXAMPLES 11 TO EXAMPLE 15 AND COMPARATIVE EXAMPLES 13 to 14

The performance of a physical solvent alone, and the mixture of the physical solvent and prior art additives of the present invention were evaluated in a bench scale glass absorber-stripper apparatus with the following characteristics:

j) standard gas feed conditions (8.7-10 mole percent $CO_2$, 1.1-1.5 mole percent COS, and the balance nitrogen, about 3 L/min), k) standard liquid feed conditions (about 11 or 30 cc/min), l) standard amount of absorber and stripper staging (small trays, 25 absorber, 20 stripper), m) approximately standard amount of stripping heat duty applied, n) standard amount of the additive used about 3 percent by weight), o) gas phase analysis by gas chromatography, liquid phase water content by Karl Fisher method, p) careful attention to ensuring steady state operation, q) liquid phase COS content was not measured, and r) stripper overhead not sampled for COS or $H_2S$.

The results obtained in the performance evaluation of different gas treating solvent are provided in Tables 7 and 8 below.

TABLE 7

|  | Comparative Example 13 | Example 11 | Example 12 003 | Example 13 |
|---|---|---|---|---|
| Base Solvent | SELEXOL ™ | SELEXOL ™ | SELEXOL ™ | SELEXOL ™ |
| Additive | None | HEP | HEP | AEE |
| Additive Concentration (wt percent) | 0 | 3 | 3 | 3 |

TABLE 7-continued

| | Comparative Example 13 | Example 11 | Example 12 003 | Example 13 |
|---|---|---|---|---|
| # Absorber Trays | 25 | 25 | 25 | 25 |
| # Stripper Trays | 20 | 20 | 20 | 20 |
| Total Gas Feed Rate (cc/min) | 2985 | 2985 | 2985 | 2985 |
| Feed $CO_2$ (mole percent) | 8.65 | 9.34 | 9.76 | 9.75 |
| Feed COS (mole percent) | 1.48 | 1.47 | 1.44 | 1.43 |
| Sweet $CO_2$ (mole percent) | 8.65 | 8.14 | 8.61 | 8.36 |
| Sweet COS (mole percent) | 1.33 | 0.52 | 0.58 | 0.41 |
| Absorber | | | | |
| Lean $H_2O$ content (wt percent) | 7.2 | 3.9 | 6.8 | 3.9 |
| Lean Solvent Flow (cc/min) | 30 | 30 | 30 | 30 |
| Lean T (F.) | 81 | 85 | 84 | 85 |
| Feed Gas T (F.)[1] | 89 | 89 | 89 | 89 |
| Sweet Gas T (F.) | 66 | 72 | 72 | 70 |
| Rich T (F.)[2] | 83 | 88 | 88 | 87 |
| Absorber P (in $H_2O$) | 28 | 28 | 28 | 28 |
| Stripper: | | | | |
| Hot Rich Inlet T (F.) | 209 | 203 | 194 | 204 |
| Overhead Vapor T (F.) | 215 | 216 | 215 | 214 |
| Reboiler T (C.) | 115 | 122 | 118 | 132 |
| COS Absorption (percent of feed) | 10 | 65 | 60 | 71 |
| CO2 Absorption (percent of feed) | 0 | 13 | 12 | 14 |

[1]measured at outlet of feed gas heater
[2]measured in pot beneath lowest absorber tray As can be seen from the Table 7 hereinabove, the SELEXOL™ solvent alone removes about 10 percent of the COS from the feed gas while the addition of about 3 wt percent of HEP or AEE to the SELEXOL™ solvent improves COS removal to 60-70 percent. Removal of $CO_2$ increases from 0 to 12-14 percent.

TABLE 8

| | Comparative Example 14 | Example 14 | Example 15 |
|---|---|---|---|
| Base Solvent | DMTP | DMTP | DMTP |
| Additive | none | HEP | NMEA |
| Additive Concentration (wt percent) | 0 | 3 | 3 |
| # Absorber Trays | 25 | 25 | 25 |
| # Stripper Trays | 20 | 20 | 20 |
| Total Gas Feed Rate (cc/min) | 2985 | 2985 | 2985 |
| Feed $CO_2$ (mole percent) | 9.75 | 9.73 | 9.66 |
| Feed COS (mole percent) | 1.43 | 1.43 | 1.42 |
| Sweet $CO_2$ (mole percent) | 9.47 | 9.14 | 8.69 |
| Sweet COS (mole percent) | 1.31 | 0.45 | 0.0 |
| Absorber: | | | |
| Lean $H_2O$ content (wt percent) | 9.1 | 4.9 | 3.9 |
| Lean Solvent Flow (cc/min) | 11 | 11 | 11 |
| Lean T (F.) | 76 | 79 | 82 |
| Feed Gas T (F.)[1] | 85 | 84 | 77 |
| Sweet Gas T (F.) | 71 | 72 | 68 |
| Rich T (F.)[2] | 82 | 83 | 82 |
| Absorber P (in $H_2O$) | 28 | 28 | 28 |
| Stripper: | | | |
| Hot Rich Inlet T (F.) | 238 | 261 | 244 |
| Overhead Vapor T (F.) | 216 | 212 | 211 |
| Reboiler T (C.) | 129 | 149 | 150 |
| COS Absorption (percent of feed) | 8 | 69 | 100 |
| CO2 Absorption (percent of feed) | 3 | 6 | 10 |

[1]measured at outlet of feed gas heater
[2]measured in pot beneath lowest absorber tray As can be seen from the Table 8 hereinabove, DMTP solvent alone removes about 8 percent of the COS from the feed gas while the addition of about 3 wt percent of HEP or NMEA to the DMTP solvent improves COS removal to about 69-100 percent. Removal of $CO_2$ increases from 3 to 6-10 percent.

As can also be seen from the Tables 1-8 hereinabove, all the solvent compositions of the present invention showed a marked improvement in COS removal with minimal additional $CO_2$ removal. Overall, the solvent compositions of the present invention comprising the SELEXOL™ solvent and the alkanolamine of formula II or piparazine compound of formula III removed COS in an amount of from 17 percent to 52 percent as compared to the SELEXOL™ solvent alone which removed COS in an amount of only about 1 percent Similarly, the solvent composition of the present invention comprising DMTP and the alkanolamine of formula II removed COS in an amount of 40-100 percent as compared to DMTP alone which removed COS in an amount of from 3-8 percent. Such magnitude of improved removal of COS by the solvent compositions of the present invention is completely unexpected and unpredictable.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A solvent composition for selective removal of COS from a gas stream containing COS and $CO_2$ with minimal removal of $CO_2$ from the gas stream, said composition comprising
   a) 1,3-dimethyl-3,4,5,6-tetrahydro-2(1H)-pyrimidinone; and
   b) at least one alkanolamine compound of the formula $$R_3NHR_4OR_6 \qquad (II)$$

or
   at least one piperazine compound of formula (III)

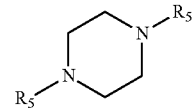

wherein $R_3$ is hydrogen, an alkyl group having from 1 to 6 carbon atoms, or the $R_4OH$ group; $R_4$ is a branched or unbranched alkylene group having from 1 to 6 carbon atoms; $R_5$, independently in each occurrence, is hydrogen or an hydroxyalkyl group having from 1 to 4 carbon atoms; and $R_6$ is hydrogen, an alkyl group having from 1 to 6 carbon atoms or an hydroxyalkyl group having from 1 to 4 carbon atoms; and c) 8.6 percent by weight or less of water.

2. The solvent composition according to claim 1 wherein the substituent $R_3$ is hydrogen.

3. The solvent composition according to claim 1 wherein the component b) is monoethanolamine.

4. The solvent composition according to claim 1 wherein $R_3$ is an alkyl group having from 1 to 6 carbon atoms or the $R_4OH$ group.

5. The solvent composition according to claim 4 wherein the alkanolamine of formula II is selected from the group consisting of diethanolamine, methylethanolamine and diisopropanolamine.

6. The solvent composition according to claim 1 wherein the component b) is piperazine.

7. The solvent composition according to claim 1 wherein the component b) is hydroxyethylpiperazine.

8. The solvent composition according to claim 1 wherein the component b) is an alkanolamine of formula II, wherein $R_3$ is hydrogen, an alkyl group having from 1 to 6 carbon atoms, or an $R_4OH$ group; $R_4$ is a branched or unbranched alkylene group having from 1 to 6 carbon atoms; and $R_6$ is hydrogen, an alkyl group having from 1 to 6 carbon atoms, or an hydroxyalkyl group having from 1 to 4 carbon atoms.

* * * * *